(12) United States Patent
Namuduri et al.

(10) Patent No.: US 8,143,766 B2
(45) Date of Patent: Mar. 27, 2012

(54) HARVESTING ENERGY FROM VEHICULAR VIBRATIONS USING PIEZOELECTRIC DEVICES

(75) Inventors: Chandra S. Namuduri, Troy, MI (US); Yunjun Li, West Bloomfield, MI (US); Timothy J. Talty, Beverly Hills, MI (US); Robert B. Elliott, Waterford, MI (US); Nancy McMahon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 12/394,326

(22) Filed: Feb. 27, 2009

(65) Prior Publication Data

US 2010/0219720 A1    Sep. 2, 2010

(51) Int. Cl.
*H01L 41/107* (2006.01)
*H02N 2/18* (2006.01)

(52) U.S. Cl. ........................................ 310/339
(58) Field of Classification Search ................ 310/339
See application file for complete search history.

(56) References Cited

U.S. PATENT DOCUMENTS

| | | | |
|---|---|---|---|
| 2,594,755 A | 4/1952 | Felt | |
| 4,297,609 A * | 10/1981 | Hirao et al. | 310/339 |
| 4,458,234 A * | 7/1984 | Brisard | 310/339 |
| 4,600,215 A | 7/1986 | Kuroki et al. | |
| 4,757,315 A | 7/1988 | Lichtenberg et al. | |
| 4,817,922 A | 4/1989 | Hovance | |
| 4,822,063 A | 4/1989 | Yopp et al. | |
| 4,827,416 A | 5/1989 | Kawagoe et al. | |
| 4,836,578 A | 6/1989 | Soltis | |
| 5,009,450 A | 4/1991 | Herberg et al. | |
| 5,056,913 A | 10/1991 | Tanaka et al. | |
| 5,103,396 A | 4/1992 | Hiwatashi et al. | |
| 5,127,667 A | 7/1992 | Okuda et al. | |
| 5,218,308 A | 6/1993 | Posebeck et al. | |
| 5,251,729 A | 10/1993 | Nehl et al. | |
| 5,267,466 A | 12/1993 | Morris | |
| 5,347,186 A | 9/1994 | Konotchick | |
| 5,373,445 A | 12/1994 | Yopp | |
| 5,390,949 A * | 2/1995 | Naganathan et al. | 310/316.01 |
| 5,450,322 A | 9/1995 | Tanaka et al. | |
| 5,461,564 A | 10/1995 | Collins et al. | |
| 5,638,927 A | 6/1997 | Cheatham et al. | |
| 5,944,763 A | 8/1999 | Iwasaki | |

(Continued)

FOREIGN PATENT DOCUMENTS

DE    39 09 190 C1    8/1990

(Continued)

OTHER PUBLICATIONS

Namuduri, Chandra S. et al. "Notice of Allowance" mailed Jan. 4, 2011; U.S. Appl. No. 12/394,438, filed Feb. 27, 2009.

(Continued)

*Primary Examiner* — Jaydi San Martin
(74) *Attorney, Agent, or Firm* — Ingrassia Fisher & Lorenz, P.C.

(57) ABSTRACT

An energy harvesting apparatus for deployment on a vehicle having a frame includes a spring assembly coupled to the frame and configured for compressions and extensions during vehicle travel. A piezoelectric device is mounted on the spring assembly for generating electrical energy in response to the strain imposed thereon. A rectifier is coupled to the piezoelectric device for converting AC electrical energy to DC.

17 Claims, 4 Drawing Sheets

U.S. PATENT DOCUMENTS

| | | | |
|---|---|---|---|
| 5,990,441 A | | 11/1999 | Zaenglein et al. |
| 6,069,581 A | | 5/2000 | Bell et al. |
| 6,111,375 A | | 8/2000 | Zenobi |
| 6,209,691 B1 | | 4/2001 | Fehring et al. |
| 6,234,654 B1 | | 5/2001 | Okuchi et al. |
| 6,328,144 B1 | | 12/2001 | Hayakawa et al. |
| 6,427,812 B2 | | 8/2002 | Crawley et al. |
| 6,502,837 B1 | | 1/2003 | Hamilton et al. |
| 6,614,239 B2 | | 9/2003 | Borghi |
| 6,694,856 B1 | | 2/2004 | Chen et al. |
| 6,771,007 B2 | * | 8/2004 | Tanielian ............... 310/339 |
| 6,866,127 B2 | | 3/2005 | Nehl et al. |
| 6,938,311 B2 | * | 9/2005 | Tanielian ............... 310/339 |
| 7,057,330 B2 | * | 6/2006 | Buhler et al. ........... 310/339 |
| 7,123,351 B1 | | 10/2006 | Schaefer |
| 7,221,437 B1 | | 5/2007 | Schaefer |
| 7,250,697 B2 | | 7/2007 | Beaulieu |
| 7,261,171 B2 | | 8/2007 | de la Torre et al. |
| 7,380,800 B2 | | 6/2008 | Klees |
| 7,420,462 B2 | | 9/2008 | Nordmeyer |
| 7,521,841 B2 | * | 4/2009 | Clingman et al. ...... 310/339 |
| 7,654,370 B2 | | 2/2010 | Cubalchini, Jr. |
| 7,733,239 B2 | | 6/2010 | Nordmeyer |
| 7,737,608 B2 | * | 6/2010 | Ruggeri et al. ......... 310/339 |
| 7,770,701 B1 | | 8/2010 | Davis |
| 7,777,396 B2 | | 8/2010 | Rastegar et al. |
| 7,839,058 B1 | * | 11/2010 | Churchill et al. ...... 310/339 |
| 7,849,983 B2 | | 12/2010 | St. Clair et al. |
| 7,948,613 B2 | | 5/2011 | Fourcault et al. |
| 2002/0032508 A1 | | 3/2002 | Uchino et al. |
| 2003/0034697 A1 | | 2/2003 | Goldner et al. |
| 2005/0077692 A1 | | 4/2005 | Ogawa |
| 2005/0090956 A1 | | 4/2005 | Ogawa |
| 2005/0270221 A1 | | 12/2005 | Fedotov et al. |
| 2006/0176158 A1 | * | 8/2006 | Fleming .................. 340/425.5 |
| 2006/0186586 A1 | | 8/2006 | Soles et al. |
| 2006/0188120 A1 | | 8/2006 | Fisher |
| 2006/0271678 A1 | | 11/2006 | Jessup et al. |
| 2007/0032913 A1 | | 2/2007 | Ghoneim et al. |
| 2007/0129865 A1 | | 6/2007 | Kim |
| 2007/0205881 A1 | | 9/2007 | Breed |
| 2007/0251776 A1 | | 11/2007 | Braun |
| 2008/0116849 A1 | | 5/2008 | Johnston |
| 2008/0252174 A1 | | 10/2008 | Mohammadi et al. |
| 2008/0277939 A1 | | 11/2008 | Richardson et al. |
| 2008/0284258 A1 | | 11/2008 | Spratte et al. |
| 2009/0021720 A1 | | 1/2009 | Hecker |
| 2009/0045698 A1 | * | 2/2009 | Genis et al. ............. 310/339 |
| 2009/0278927 A1 | | 11/2009 | Ishiyama et al. |
| 2010/0045143 A1 | * | 2/2010 | Martin .................... 310/339 |
| 2010/0052475 A1 | | 3/2010 | Lee |
| 2010/0084947 A1 | * | 4/2010 | Yoon et al. ............. 310/339 |
| 2010/0094503 A1 | | 4/2010 | Li et al. |
| 2010/0123568 A1 | | 5/2010 | Namuduri et al. |
| 2010/0125389 A1 | | 5/2010 | Talty et al. |
| 2010/0219641 A1 | | 9/2010 | Namuduri et al. |
| 2010/0219721 A1 | | 9/2010 | Namuduri et al. |
| 2010/0219798 A1 | | 9/2010 | Namuduri et al. |
| 2010/0225527 A1 | | 9/2010 | Talty et al. |
| 2010/0244629 A1 | * | 9/2010 | Nagashima et al. ......... 310/339 |

FOREIGN PATENT DOCUMENTS

| | | |
|---|---|---|
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

Chinese Office Action for Chinese Application No. 200910206391.1 mailed Jan. 19, 2011.

U.S. Office Action for U.S. Appl. No. 12/271,551 mailed Feb. 10, 2011.

German Office Action for German Application No. 10 2009 047 855.8-21 mailed Jan. 21, 2011.

German Office Action for German Application No. 10 2009 052 717.6-21 mailed Feb. 16, 2011.

Notice of Allowance mailed Nov. 18, 2010, issued in U.S. Appl. No. 12/394,438.

Notice of Allowance mailed Oct. 18, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "OPTEK's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

Li, Y., et al. "Self-Powered Vehicle Sensor Systems," U.S. Appl. No. 12/900,707.

German Office Action for German Application No. 10 2010 008 318.6 mailed May 11, 2011.

U.S. Office Action dated Jul. 6, 2011 for U.S. Appl. No. 12/252,114.

U.S. Notice of Allowance dated Jul. 18, 2011 for U.S. Appl. No. 12/394,322.

U.S. Final Office Action dated Jul. 15, 2011 for U.S. Appl. No. 12/271,551.

U.S. Office Action dated Aug. 1, 2011 for U.S. Appl. No. 12/272,074.

U.S. Office Action for U.S. Appl. No. 12/394,328 mailed Jun. 10, 2011.

Notice of Allowance, dated Dec. 12, 2011, for U.S. Appl. No. 12/252,114.

Notice of Allowance, dated Jan. 9, 2012, for U.S. Appl. No. 12/272,074.

Notice of Allowance, dated Jan. 5, 2012, for U.S. Appl. No. 12/271,551.

* cited by examiner

HARVESTING ENERGY FROM VEHICULAR VIBRATIONS USING PIEZOELECTRIC DEVICES

TECHNICAL FIELD

This relates generally to a system for generating power and, more particularly, to a system for harvesting energy from vehicular vibrations utilizing piezoelectric devices.

BACKGROUND OF THE INVENTION

Increasing demands for better fuel economy have lead to improvements and developments in hybrid vehicles, electric vehicles, and vehicles powered by fuel cells or diesel fuel. Efforts on the part of the automotive industry to increase fuel economy have included, but are not limited to, reductions in mass, improved aerodynamics, active fuel management, direct injection engines, homogeneous charge compression ignition engines, and hybrid engines. Still, other mechanisms, techniques, and energy sources that will improve fuel economy are continually being sought. To this end, the use of piezoelectric materials to harvest energy has received a great deal of attention in recent years. As is well known, the piezoelectric effect involves the conversion of mechanical strain into electric current or voltage. Many different sources could provide the requisite strain; e.g. human motion, seismic activity, vibrations, etc.

It is generally known that vehicles are subjected to vibrations, especially while being driven. These vibrations have typically been considered undesirable. In fact, a great deal of effort has gone into the development of suspension systems that include springs, dampers, and the like, that provide vehicular stability and insulate the vehicle's passenger compartment from vibration caused by, for example, driving on bumpy or otherwise tortuous roadways. Currently, the energy associated with these vibrations is lost. However, harvesting and utilizing this energy would provide an additional source of energy that could be used to increase fuel economy. The ability to tap this additional source of energy while not compromising the benefits of modern vehicular suspension systems would greatly benefit both the automotive industry and their customers.

SUMMARY

In accordance with an embodiment, an energy harvesting apparatus is provided for deployment on a vehicle having a frame. The energy harvesting apparatus comprises a spring assembly coupled to the frame and configured for compressions and extensions during vehicle travel. A piezoelectric device is mounted on the spring assembly for generating electrical energy in response to strain imposed thereon in response to the compressions and extensions of the spring assembly. A rectifier is coupled to the piezoelectric device for converting the electrical energy from AC to DC.

DESCRIPTION OF THE DRAWINGS

The embodiments will hereinafter be described in conjunction with the following drawing figures, wherein like numerals denote like elements, and.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Piezoelectricity is a characteristic of certain materials to generate an electric potential when they are subjected to a mechanical stress. Known piezoelectric materials include, but are not limited to, naturally occurring crystals, man-made crystals, and certain ceramics. More recently, piezoelectric fiber composite transducers have been developed that have certain advantages over bulk piezoelectric ceramics. For example, they are lighter, more flexible, and more robust. Higher piezoelectric voltage coefficients can be obtained from piezoelectric fiber composites resulting in more generated power. Furthermore, piezoelectric fiber composites can be created inexpensively to user defined shapes. They provide increased strength over monolithic materials as a result of fiber lead sharing, and may be laminated with durable polyethylene sheets for additional toughness. Piezoelectric fiber composites may be used singly, or multiply in parallel, to accumulate power for an extended period of time. Such devices are well known and commercially available from Advanced Cerametrics, Inc., located in Lambertville, N.J.

Figure 1:
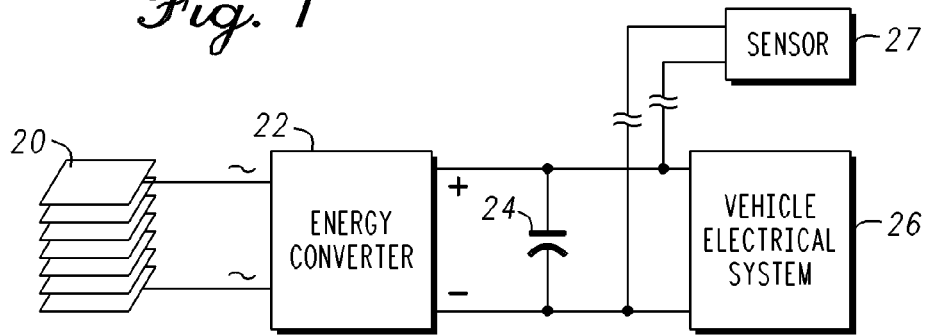
FIG. 1 is a functional block diagram of an energy harvesting apparatus.

FIG. 1 is a functional block diagram of an apparatus for generating energy utilizing a single layer or stacked multilayer piezoelectric fiber composite (PFC) 20 (shown as a multilayer stack in FIG. 1) having an AC output coupled to energy converter 22 (e.g. a rectifier). The output of energy converter 22 is coupled to an energy storage device 24 (e.g. a capacitor and/or a battery). The output of energy converter 22 may also be coupled to a vehicle's electrical system 26 or, if desired, may provide power one or more sensors 27 that, in turn, provide information to one or more of the vehicle's on-board processors.

Figure 2:
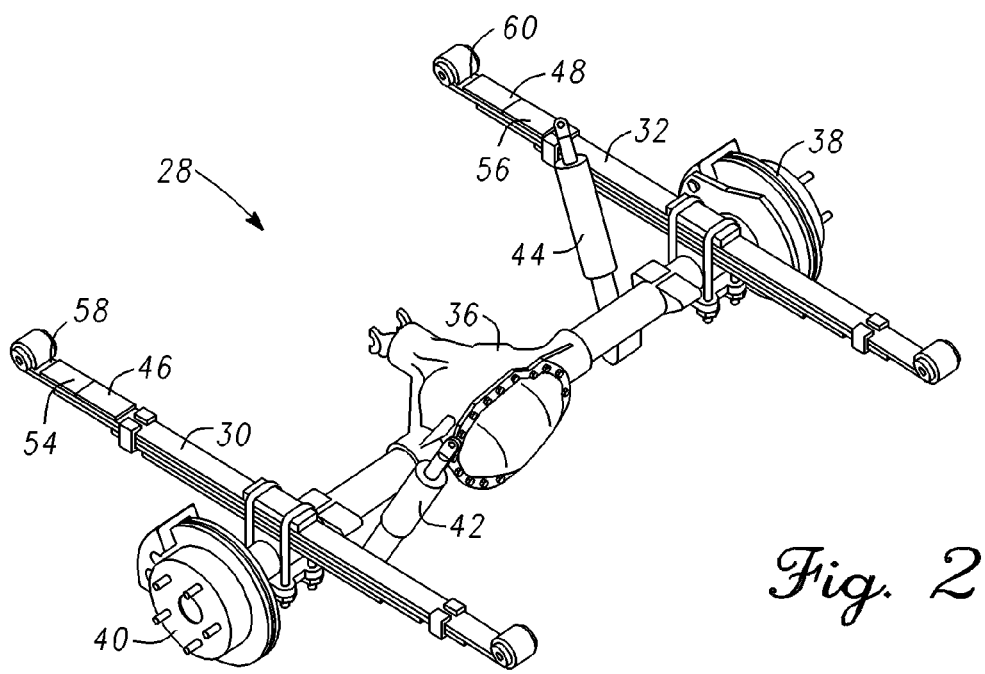
FIG. 2 is an isometric view of an energy harvesting apparatus in accordance with a first embodiment.

FIG. 2 is an isometric view of a vehicular spring suspension system 28, in accordance with a first embodiment. As can be seen, leaf spring assemblies 30 and 32 are coupled to an axle/differential housing 36. Individual wheels (not shown) are coupled to rotors 38 and 40 respectively.

Leaf spring assemblies (30 and 32) are simple forms of springs commonly used for the suspension of wheeled vehicles which, in recent times, are most commonly found on heavy vehicles such as trucks, vans, SUVs, and the like. A leaf spring assembly generally takes the form of a slender, arc-shaped length of steel spring having a generally rectangular cross-section. Attachment means are provided at each end for securing the leaf spring assembly to the vehicle's frame or body. For heavier vehicles, several leaves may be stacked on each other forming several layers typically with progressively shorter leaves. A leaf spring assembly may be attached directly to the frame at both ends, or at one end directly and through a shackle, or short swing arm, at the other end. The shackle takes up the elongation of the spring when the spring is compressed. A more modern parabolic leaf spring assembly is characterized by fewer leaves having thicknesses that vary from their center to their ends in a substantially parabolic curve. Friction and contact between leaves is undesirable, and isolation pads and spacers have been used to prevent contact between the leaves.

Figure 3:
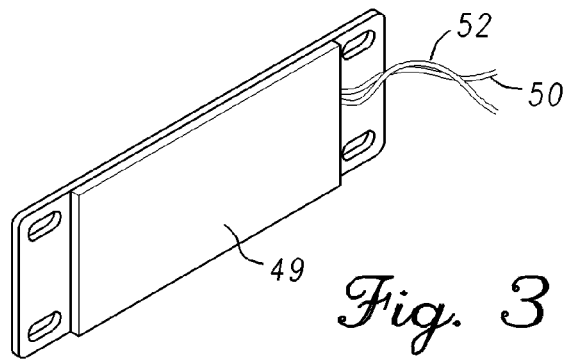
FIG. 3 is an isometric view of a piezoelectric fiber composite device.

Referring again to FIG. 2, first and second flexible piezoelectric devices 46 and 48 (e.g. piezoelectric fiber composites as described above) are attached to the top of the first leaf of leaf spring assemblies 30 and 32, respectively. One such device 49 is shown in FIG. 3 for clarity. As the leaf springs on which piezoelectric devices 46 and 48 are attached compress or expand during vehicle suspension travel, the piezoelectric devices 46 and 48 will deform causing a voltage to be generated across their respective terminals (e.g. 50 and 52 in FIG. 3). The generated voltage is proportional to the degree of strain or stress that the leaf spring undergoes. Thus, as the amount of the deformation increases and/or the frequency of the deformation increases, then the amount of electric power generated by piezoelectric devices 46 and 48 increases. Rectifiers 54 and 56 may be mounted on the leaf spring and adjacent to piezoelectric devices 46 and 48, respectively, to convert the AC energy generated by piezoelectric devices 46 and 48 to DC for powering sensors 58 and 60, respectively, likewise mounted on the leaf springs as shown. It should be clear, however, that rectifiers 54 and 56 may be mounted elsewhere (e.g. on the vehicle's frame). Furthermore, piezoelectric devices 36 and 48 may be used directly as sensors.

Figure 4:
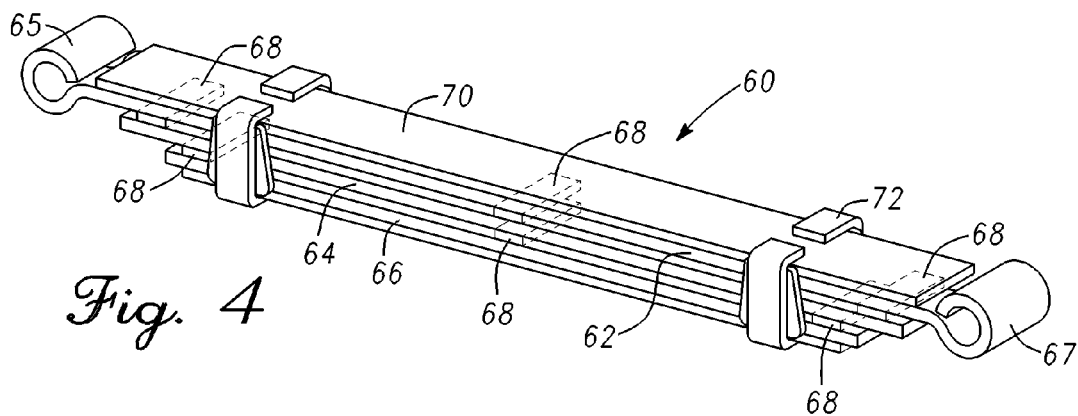
FIGS. 4 and 5 are isometric and functional views of an energy harvesting apparatus in accordance with a second embodiment.
Figure 5:
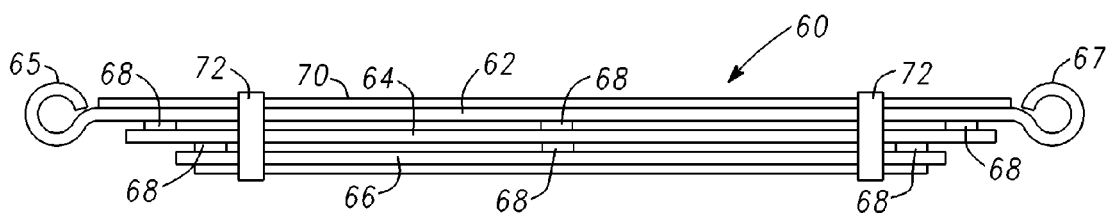
Figure 6:
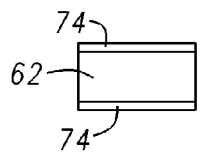
FIGS. 6 and 7 are cross-sectional views of a leaf spring leave in accordance with the embodiments shown in FIGS. 4 and 5.
Figure 7:
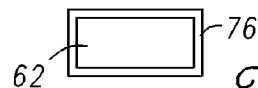

FIGS. 4 and 5 are isometric and exploded views, respectively, of a leaf spring assembly in accordance with a further embodiment. A leaf spring assembly 60 includes, for example, three leaves 62, 64, and 66. Top leaf 62 is provided with couplers 65 and 67 that facilitate the coupling of leaf spring assembly 60 to a vehicle's frame. Since inter-leaf friction is undesirable in modern leaf spring assemblies, isolation pads 68 are provided between leaves. A layer of piezoelectric material 70 (e.g. a piezoelectric fiber composite) is coupled to the upper surface of leaf spring 62. It may be bonded to the upper surface of leaf 62 using a suitable chemical bonding material. Alternatively, piezoelectric material 70 may be clipped onto the upper surface of leaf 62 by means of mechanical clips 72 or a plurality of clips. If desired, piezoelectric material may be attached to both upper and lower surfaces of one or more leaves of leaf spring assembly 60 as is shown at 74 in FIG. 6 or attached on four surfaces of each leaf as shown in FIG. 7. The piezoelectric material deposited in accordance with the above may be coupled to an energy converter 22 (e.g. rectifier 54) as described in connection with FIGS. 1 and 2. Further, the multiple piezoelectric elements could be fastened to the surfaces and electrically connected in either a parallel or series arrangements where the parallel connection enables continued operation in the event of an electrical open in any one of the devices and the series connection enables continued operation in the event of an electrical short in any one of the devices.

Figure 8:
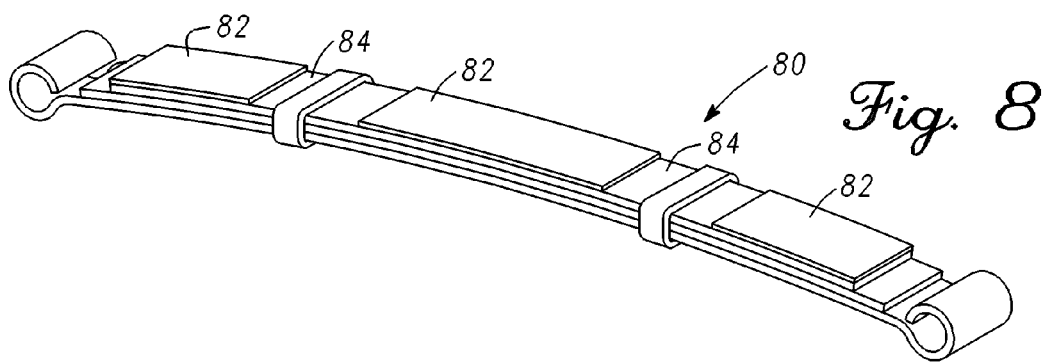
FIG. 8 is an isometric view of an energy harvesting apparatus in accordance with a third embodiment.
Figure 9:
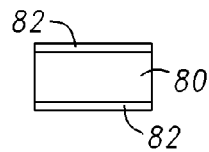
FIGS. 9, 10, and 11 are cross-sectional views of the apparatus shown in FIG. 8.
Figure 10:
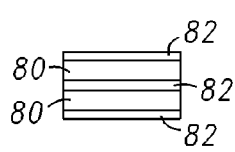
Figure 11:
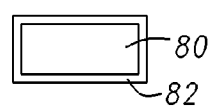

FIG. 8 is an isometric view of a leaf spring assembly in accordance with a still further embodiment. In this case, piezoelectric devices such as piezoelectric fiber composites 82 may be attached to the surface 84 at various locations on leaf spring 80. As was the case previously, piezoelectric fiber composites 82 may be coupled to an energy converter (e.g. a rectifier) and the resultant DC energy stored on a battery or capacitor and/or used to drive one or more components, devices, and/or sensors on the vehicle. The piezoelectric fiber composite material may be attached to the major surfaces of the leaf spring 80 (FIG. 9), on the four surfaces of leaf spring 80 (FIG. 10), or the piezoelectric material 82 may be incorporated into a laminated composite spring as is shown in FIG. 11; i.e. alternating layers of spring material and piezoelectric material, or alternatively, inside a laminated composite spring so as to be protected from the underbody dirty environment.

Figure 12:
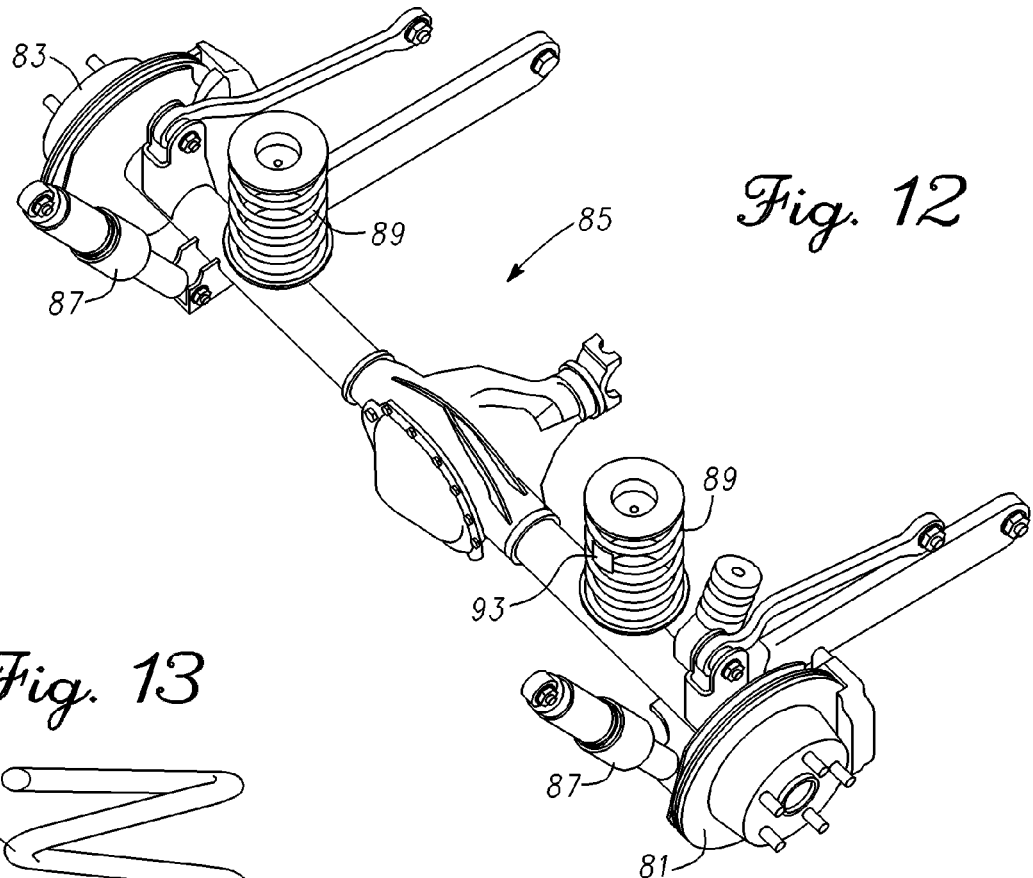
FIG. 12 is an isometric view of an energy harvesting apparatus in accordance with a fourth embodiment.
Figure 13:
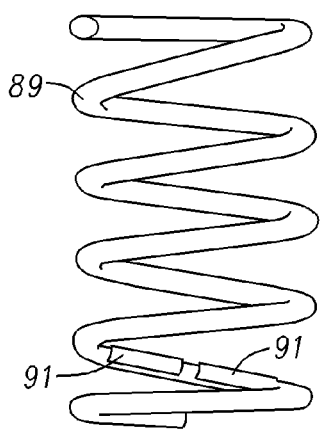
FIG. 13 is an isometric view of a coil spring suitable for use in the embodiment shown in FIG. 16.

FIG. 12 is an isometric view of an energy harvesting apparatus in accordance with a fourth embodiment and illustrates some standard components of an automotive coil spring suspension system. First and second hubs 81 and 83 are mounted for rotation on axle assembly 85. Damper assemblies 87 and coil springs 89 are coupled between axle assembly 85 and the vehicle's frame (not shown) in the well known manner to provide a smoother and more stable ride. In this embodiment, flexible piezoelectric composite strips 91 of the type described above are mounted on coil spring 89 as is shown more clearly in FIG. 13. As the coil springs extend and compress during vehicle travel, piezoelectric strips 91 (or a plurality of patches in series or parallel) will deform resulting in a voltage across the piezoelectric device's terminals (e.g. 50 and 52 in FIG. 3). A rectifier 93 may be mounted to the vehicle's structure (e.g. the axle assembly) and coupled to piezoelectric strips 91 to convert the AC signal at the piezoelectric strip's output terminals to DC energy, which may be stored in a battery or capacitor and/or used to power a sensor that may likewise be coupled to the vehicle's structure or an actuator, on-board processor; e.g. an ECU. In the case of a composite coil spring, the piezoelectric material could be placed between laminated layers.

Figure 14:
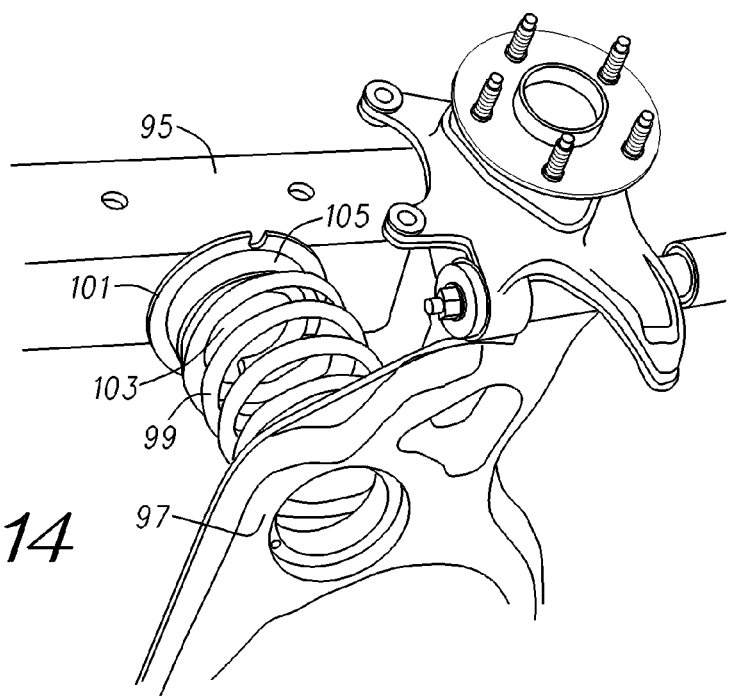
FIG. 14 is an isometric view of an energy harvesting apparatus in accordance with a fifth embodiment.

FIG. 14 is an isometric view of an energy harvesting apparatus in accordance with a fifth embodiment. There is shown in FIG. 14 an automotive suspension that comprises a frame or body side rail 95, a lower control arm 97, and a coil suspension spring 99 coupled between frame 95 and control arm 97. As can be seen, spring 99 is coupled to frame 95 by means of a spring seat 101 having a central protrusion 103 that positions the upper portion of spring 99, and a spring isolator 105 made of a resilient material (e.g. rubber, polyurethane elastomer, etc.) positioned between coil spring 99 and spring seat 101 to avoid contact noise during suspension travel.

Figure 15:
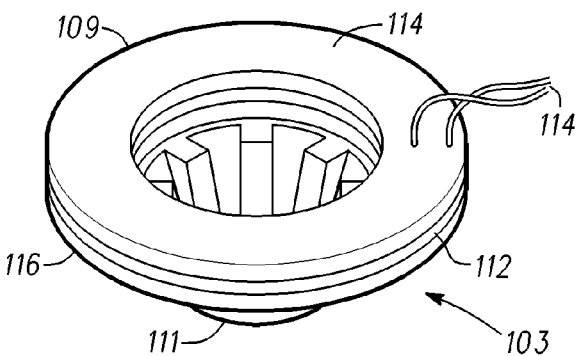
FIGS. 15 and 16 are isometric views of first and second spring isolators for use in the embodiment shown in FIG. 14.
Figure 16:
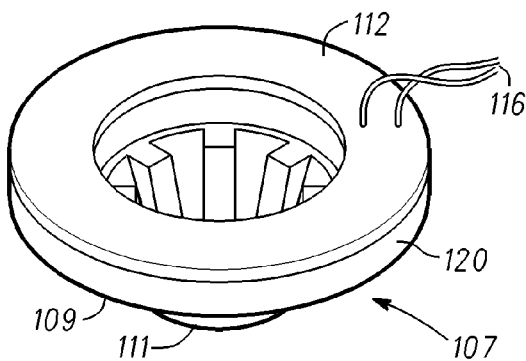

FIGS. 15 and 16 are first and second embodiments of spring isolators 103 and 107, respectively. In each case they comprise an annular portion 109 and a central protrusion 11. Each is provided with a piezoelectric annular disk 112. In FIG. 15, piezoelectric disk 112 is positioned between layers of resilient material 114 and 116. In FIG. 16, a layer of piezoelectric material 118 resides on an upper surface of resilient material 120. The piezoelectric material may, alternatively, be molded inside the isolator so as to be protected from the underbody dirty environment.

Thus, when either spring isolator 103 or 107 is positioned between coil spring 99 and spring seat 101, compressions and expansions in coil spring 99, resulting from roadway perturbations encountered during vehicle travel, will result in deformations of piezoelectric disk's 103 or 107 resulting in the generation of AC energy at the disk's output terminals 114 and 116, respectively. This energy may be harvested by a rectifier assembly mounted on the frame. The rectifier may in turn power a sensor and/or charge a battery or a capacitor as previously described.

Figure 17:
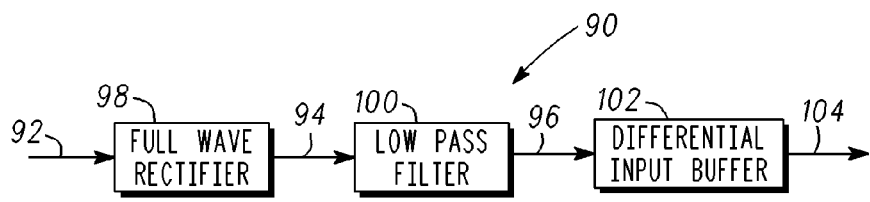
FIG. 17 is a functional block diagram of a rectifying and filtering circuit suitable for use in conjunction with the apparatus shown in FIGS. 1, 2, 4, 5, 8, 12, and 14.
Figure 18:
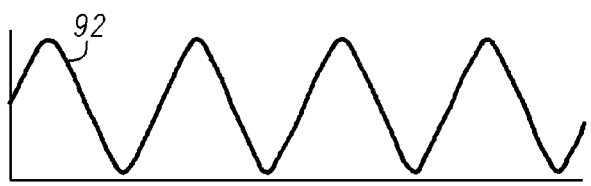
FIGS. 18, 19, and 20 are exemplary waveforms appearing at various points in the block diagram shown in FIG. 17.
Figure 19:
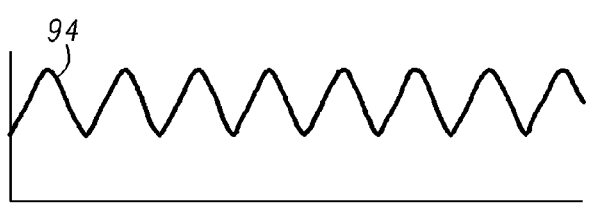
Figure 20:
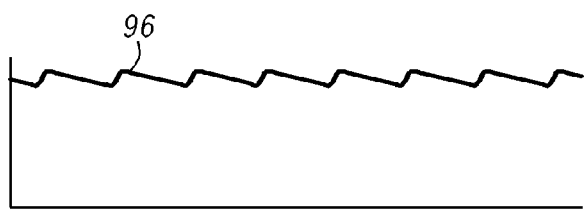

FIG. 17 is a block diagram of a rectifier circuit 90 suitable for use in conjunction with the embodiment shown in FIGS. 1, 2, 4, 5, 8, 12 and 14. FIGS. 18, 19, and 20 illustrate exemplary waveforms 92, 94, and 96 that appear at various places in the block diagram shown in FIG. 17 as will be more fully described below.

Referring to FIGS. 17-20, the AC signal (92 in FIG. 18) appearing at the outputs of the piezoelectric device (FIG. 3) is applied to full wave rectifier 98. The rectified signal 94 (shown in FIG. 19) appearing at the output of rectifier 98 is applied to low pass filters 100 to produce signal 96 (shown in FIG. 20).

Thus, there has been presented an apparatus that harvests energy created when a vehicle's suspension system is acted upon by perturbations (bumps, pot-holes, etc.) in a roadway. Stress and strain on spring assemblies are converted to AC electrical energy in a piezoelectric device (e.g. a piezoelectric fiber composite). The resultant induced AC energy is then converted to a form suitable for storage and/or use by the vehicle's electrical system.

While at least one exemplary embodiment has been presented in the foregoing summary and detailed description, it should be appreciated that a vast number of variations exist. For example, the battery or capacitor could be packaged with the rectifier or packaged separately. The rectifier assembly could be mounted on the spring assembly or on a separate structure. If desired, a sensor may likewise be mounted on the spring assembly itself and powered by the rectifier. Alternatively, the sensor may be remotely located.

It should be appreciated that the exemplary embodiments are only examples, and are not intended to limit the scope, applicability, or configuration in any way. Rather, the foregoing summary and detailed description will provide those skilled in the art with a convenient road map for implementing an exemplary embodiment or embodiments of the invention, it being understood that various changes may be made in the function and arrangement of described elements without departing from the scope as set forth in the appended claims and their legal equivalents.

What is claimed is:

1. An energy harvesting apparatus, comprising:
a vehicular spring assembly configured for compressions and extensions during vehicle travel, wherein the spring assembly comprises one or more leaf springs; and
a piezoelectric device mounted on all four sides of at least one of the one or more leaf springs of the vehicular spring assembly for generating electrical energy in response to strain imposed thereon in response to the compressions and extensions.

2. An apparatus according to claim 1 wherein the piezoelectric device is a piezoelectric fiber composite.

3. An apparatus according to claim 2 wherein the spring assembly comprises a coil spring.

4. An apparatus according to claim 3 wherein the energy harvesting apparatus is configured for use on a vehicle having a frame and a spring seat coupled to the frame and wherein a is positioned between the spring seat and the coil, the apparatus further comprising a piezoelectric disk positioned between the spring seat and the coil spring.

5. An apparatus according to claim 3 wherein the energy harvesting apparatus is configured for use on a vehicle having a frame and a spring seat coupled to the frame and wherein a spring isolator is positioned between the spring seat and the coil, the apparatus further comprising a piezoelectric disk imbedded in the spring isolator.

6. An apparatus according to claim 2 further comprising an energy converter coupled to the piezoelectric fiber composite.

7. An apparatus according to claim 6 wherein the energy converter is a rectifier.

8. An apparatus according to claim 7 further comprising a sensor coupled to the rectifier for receiving energy therefrom.

9. An apparatus according to claim 2 wherein the piezoelectric fiber composite is mounted on an upper surface of one or more of the leaf springs.

10. An apparatus according to claim 9 wherein the piezoelectric fiber composite is mounted on a lower surface of one or more of the leaf springs.

11. An apparatus according to claim 10 wherein the piezoelectric fiber is imbedded in one or more of the leaf springs.

12. An energy harvesting apparatus deployed on a vehicle having a frame, the apparatus comprising:
a leaf spring assembly coupled to the frame and configured for compressions and extensions during vehicle travel;
a piezoelectric device mounted on all four sides of the leaf spring assembly for generating electrical energy in response to strain imposed thereon in response to the compressions and extensions; and
a rectifier coupled to the piezoelectric device for converting the electrical energy from AC to DC.

13. An apparatus according to claim 12 wherein the piezoelectric device is a piezoelectric fiber composite.

14. An apparatus according to claim 13 further comprising a sensor coupled to the rectifier and receiving DC energy therefrom.

15. An apparatus according to claim 12 wherein the piezoelectric device is a multi-layer piezoelectric fiber composite.

16. An energy harvesting apparatus configured to be deployed on a vehicle having a frame, the apparatus comprising:

a leaf spring assembly comprising one or more leaf springs coupled to the frame and configured for compressions and extensions during vehicle travel, the leaf spring assembly having a plurality of surfaces comprising four surfaces for each leaf spring of the leaf spring assembly;

piezoelectric fiber composite material attached to each of the four sides of a leaf spring of at least one leaf spring plurality of surfaces for generating AC electrical energy in response to strain imposed thereon due to the compressions and extensions; and a rectifier coupled to the piezoelectric fiber composite for converting the AC electrical energy to DC energy.

17. An apparatus according to claim 16 further comprising a sensor coupled to the rectifier.

* * * * *